Patented Mar. 31, 1953

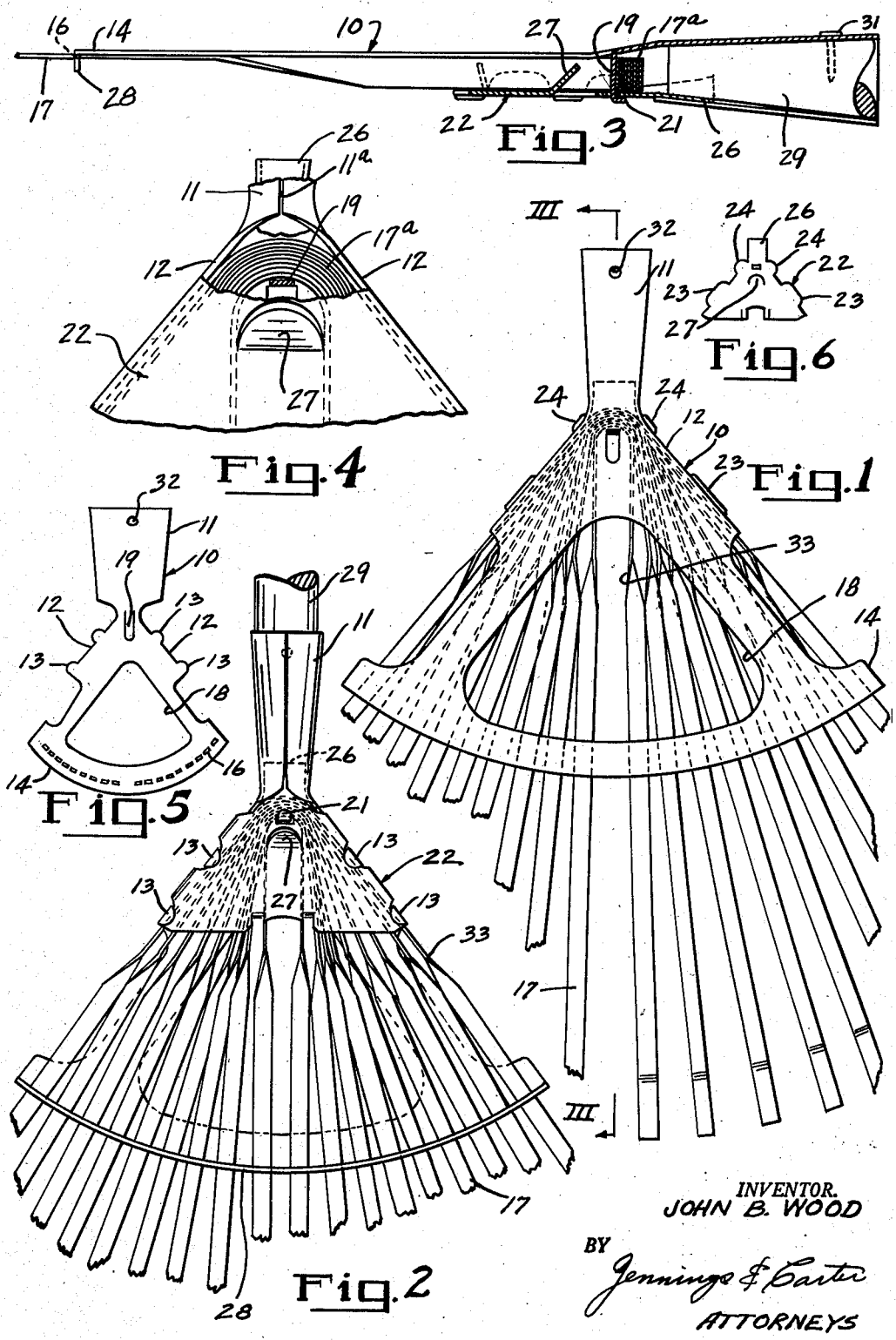

2,632,992

UNITED STATES PATENT OFFICE 2,632,992

LEAF RAKE

John B. Wood, Birmingham, Ala.

Application March 13, 1952, Serial No. 276,287

3 Claims. (Cl. 56—400.17)

My present invention relates to leaf rakes and has for an object the provision of a leaf rake in which the tines thereof are secured to the frame of the rake in an improved manner whereby the tines remain securely clamped in the frame, which frame as will be understood, also includes a socket member for a handle.

A more specific object is to provide a leaf rake having the usual flat tines doubled or looped back to provide rake teeth at each end, and in which the doubled back tines are wedged by an inturned member on the frame or cover for the frame surrounding the looped or bent ends of the tines, thus securely and resiliently fastening the tines in place by spreading them apart, into contact with edge walls of the frame.

Another object is to provide a tine and handle holder for leaf rakes comprising a frame carrying an integrally formed arcuate extension spaced intermediate the ends of the tines to reinforce the same, together with a cover member clamped to a side of the frame, the cover being provided with a rounded, upward extension fitting into the lower end of the handle socket carried by the frame, the whole cooperating to form an exceedingly strong, durable rake which is particularly reinforced at the lower end of the handle socket, where the socket joins the frame proper.

A further object of my invention is to provide a leaf rake which is simple of construction and manufacture and which may be manufactured by the inexpensive, speedy process of die forming the parts thereof from sheet metal.

A leaf rake illustrating features of my invention is shown in the accompanying drawings forming a part of this application in which:

Fig. 1 is a fragmental plan view of my improved rake looking at the same from the upper side of the rake;

Fig. 2 is a view corresponding to Fig. 1 and looking at the assembled rake from the opposite side;

Fig. 3 is a detail sectional view taken generally along line III—III of Fig. 1;

Fig. 4 is an enlarged fragmental view partly broken away and in section showing the method of securing the looped or curved ends of the tines in the frame;

Fig. 5 is a reduced developed plan view of the portion of the frame which carries the socket and the tine reinforcing member; and, Fig. 6 is a reduced developed plan view of the cover member for the frame.

Referring now to the drawings for a better understanding of my invention my improved leaf rake comprises a fan shaped frame indicated generally by the numeral 10. The frame may be formed of an integral piece of sheet metal indicated in Fig. 5 in developed view. It will be seen that the frame comprises a portion 11 adapted to be formed into a somewhat tapered, open ended handle socket. Next below the socket portion are edges 12 which carry ears 13 adapted to be bent over a cover member as will appear, thus to lock the cover to the portion being described. Next below the edge portions 12 is an arcuate extension 14 which has a plurality of holes 16 therein through which pass the intermediate sections of the several tines 17. If desired, the stamping may be provided with lightening holes 18.

In the manner well understood, the tines 17 are bent back upon themselves as shown more clearly in Fig. 4 to provide curved or looped ends 17a nested together and which lie between the edge walls 12 of the frame 10. Projecting upwardly from the frame 10 is a lug 19 which is adapted to be bent over the cover member as will be explained and as shown at 21 in Fig. 3. The purpose of the lug 19 is to bear against the loop of the innermost set of the tines, and aid in holding the entire nested assembly in place.

Disposed to fit over the looped ends of the tines and to clamp and be clamped to the frame 10 is a cover member indicated generally by the numeral 22. This member is generally fan-shaped or triangular as viewed in developed plan view, Fig. 6. As shown, the same is provided with lug portions 23 and 24 on each edge which are adapted to be clamped or bent over the edges 12 of the frame 10. Further, the cover 22 is provided with an extension 26 which is adapted to be formed into rounded shape and to project up into the lower open end of the socket 11 of the frame 10. This is clearly shown in the assembled view and is illustrated particularly in Fig. 4. It will be noted that the rounded portion 26 spans the joint 11a between the edges of the metal of the portion 11 and that this serves to considerably reinforce the lower end of the socket 11 at the point where the same joins to the body of the frame 10.

By reference to Figs. 3 and 4 it will be seen that the cover 22 is provided with a semi-circular inturned lip or lug 27. This lug is so disposed relative to the loops 17a of the tines 17 that it contacts the inner sides of the innermost set of the tines and wedges all of the curved or looped ends of the tines against each other and against the edge walls 12 of the frame 10. While the several looped tines actually do not touch each other laterally of the points of engagement of the lug 27 therewith, it will nevertheless be seen that the lug serves the important function of urging all of the tines resiliently against the edge walls 12. Thus, especially, when considered with the lug 19, the wedging lug or member 27 is very effective in holding the tines resiliently in place.

It will be understood that the portion 14 of the frame member 10 may have an arcuate down-turned reinforcing lip 28 adjacent the point where the teeth pass through the slots 16. It will further be noted that the lip 28 and the portions 14 are integrally formed with the frame 10 thus considerably increasing the strength of the entire unit.

It will be apparent that when the handle 29 is inserted the same may be wedged into overlying engagement with the extending portion 26 of the cover 22. This results in a very strong connection between the handle and the complete frame of the rake. The handle may be held in place by means of a nail or the like 31 passing through a hole 32 provided in the socket portion 11.

In the manner understood, the tines 17 have their inner looped ends lying in a plane at right angles to the plane occupied by the flat portions of the frame 10 and cover 22. Somewhat outwardly thereof, the tines are twisted as indicated at 33 so that the outer ends lie in a plane normal to the inner looped ends thereof.

From the foregoing it will be apparent that I have devised an improved leaf rake which is extremely durable of construction and one in which the tines are effectively prevented from pulling loose. It will be understood that the wedging action of the lip 27 is such that when the tines tend to move outwardly, the wedging action increases. In some cases it is desirable to omit the lug 19 and move the wedging lug 27 closer to the bight ends of the tines and employ it alone to hold the nested tines in place. In actual practice my improved rake has proven far superior to other rakes of this general type with respect to maintaining the tines in place, which is one of the chief difficulties encountered with this type leaf rake.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a leaf rake or the like, a frame for the tines having an open tubular handle socket at its upper end, a plurality of tines formed of looped members with the looped ends lying on the frame member, a cover for the frame overlying the looped ends and made fast to the frame, an extension on the cover entering the lower end of the socket, and a wedge member lying inwardly of the assembled frame and cover between the tines adjacent the looped ends and holding the looped ends engaged against each other.

2. In a leaf rake or the like, a tine frame of sheet metal having an open tubular handle socket at its upper end, a plurality of tines formed of flat strips of metal having loops intermediate the ends thereof and nested together, a generally triangular shaped portion on the sheet metal frame on which the nested looped ends of the tines are disposed, a generally triangular sheet metal cover fitting over the looped ends of the tines and made fast to the frame, a curved extension on the upper end of the cover passing through the lower end of the socket, and an inturned lip on the cover projecting between the innermost looped ends of the tines and holding the entire group of looped ends pressed resiliently outwardly.

3. In a leaf rake or the like, a generally fan-shaped frame having a handle receiving socket open at both ends, said socket being disposed at the top of the fan-shaped frame, a plurality of double ended metal tines having curved intermediate portions nested together and placed on the frame near the lower end of the socket, a cover member overlying the nested ends and secured to the frame, and an inturned lug adjacent the longitudinal center of the cover member of a width to engage the inner surfaces of the innermost curved tines and hold the group thereof pressed outwardly.

JOHN B. WOOD.

REFERENCES CITED

The following references are of record in the file of this patent:

UNITED STATES PATENTS

| Number | Name | Date |
|---|---|---|
| 1,706,507 | Withington | Mar. 26, 1929 |
| 2,066,036 | Greenwood | Dec. 29, 1936 |
| 2,519,714 | Stevens et al. | Aug. 22, 1950 |